United States Patent Office 3,436,035
Patented Apr. 1, 1969

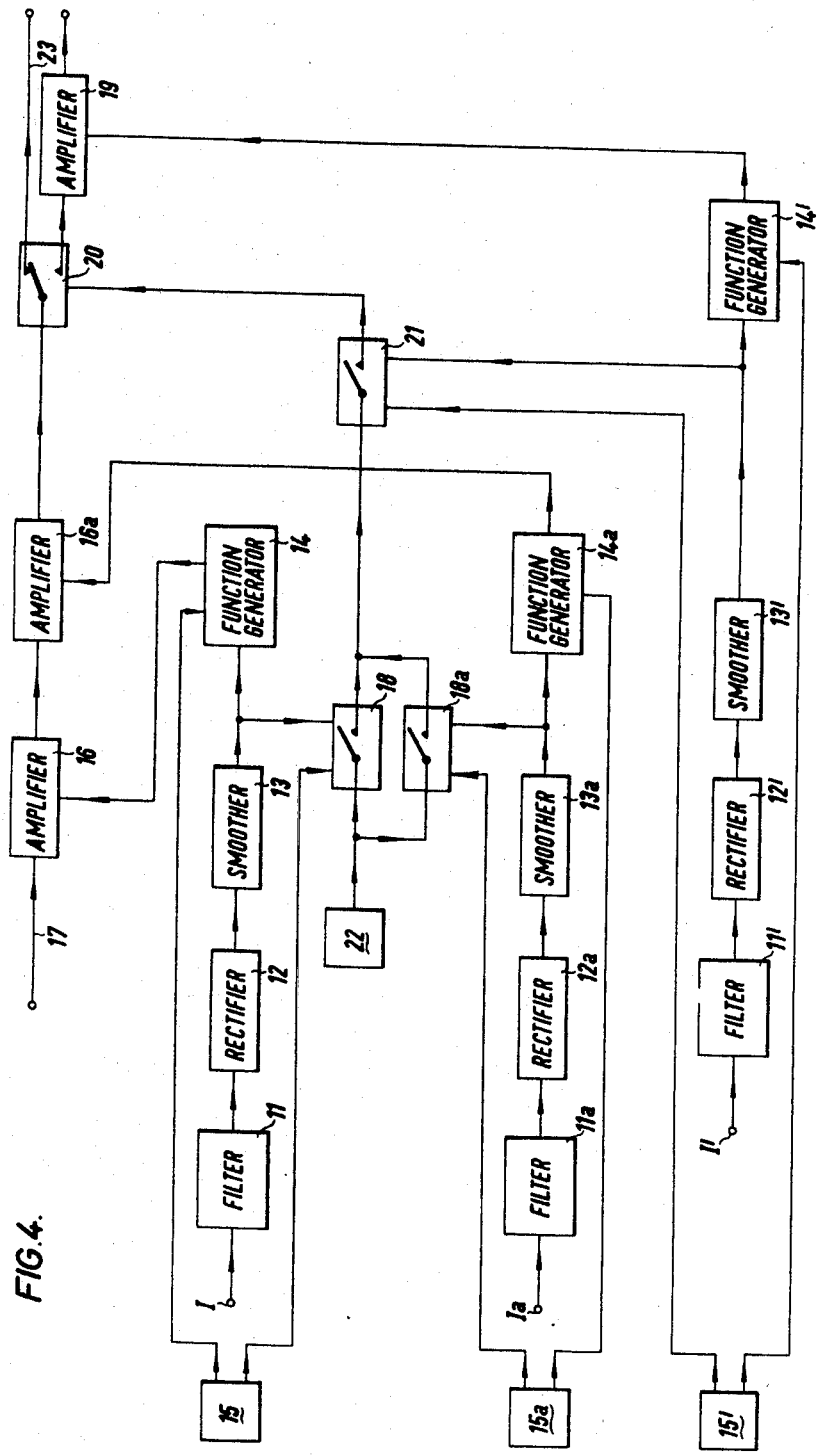

3,436,035
AIRCRAFT CONTROL APPARATUS
Eric Priestley, Lewisham, London, England, assignor to Elliott Brothers (London) Limited, London, England, a British company
Filed Nov. 3, 1966, Ser. No. 591,912
Claims priority, application Great Britain, Nov. 16, 1965, 48,730/65
Int. Cl. B64c 13/50
U.S. Cl. 244—77    14 Claims

ABSTRACT OF THE DISCLOSURE

A signal representing a measured function of aircraft motion is passed through a high-pass filter to develop therefrom a signal free of any component representative of the mean value of the function and when this signal exceeds a predetermined value the gain of an amplifier in a control channel in the aircraft is reduced.

---

The invention relates to apparatus capable of detecting when an aircraft enters disturbed air and also possibly of modifying automatic control action appropriately.

There is provided by the present invention apparatus for detecting when an aircraft enters disturbed air, comprising filter means and means for feeding thereto a signal representative of motion of the aircraft relative to the air; the filter means being such that the mean value of the aircraft motion is disregarded.

The output of the filter means may be arranged to be rectified and smoothed to produce an output signal whose magnitude is representative of the turbulence of the air which the aircraft has entered.

The arrangement may be such that the signal thereto is to be representative of indicated air speed. Alternatively the arrangement may be such that the signal thereto is to be representative of Mach number and in either case, a high-pass filter means would be employed.

According to a further aspect of the invention apparatus capable of detecting when an aircraft enters a large moving air mass, comprises high-pass filter means arranged to be fed with a signal representative of the altitude of the aircraft whereby the mean value of the aircraft altitude is disregarded. The output of the high-pass filter means may be arranged to be rectified and smoothed to produce an output signal whose magnitude is representative of the disturbance to the aircraft flight path due to entering the large moving air mass.

According to one embodiment of the invention, there is provided an aircraft control system for controlling movement of the aircraft when flying in disturbed air providing apparatus comprising filter means, means for feeding thereto a signal representative of motion of the aircraft relative to the air (and hereinbelow referred to as the representative signal); the filter means being such that the mean value of the aircraft motion is disregarded; means for rectifying and smoothing the output of the filter means to produce an output signal whose magnitude is a measure of the air disturbance and means for utilising said output signal to reduce the gain of a control signal of the aircraft when the output signal exceeds a predetermined magnitude.

The representative signal may be one representative of vertical velocity or of indicated air speed, Mach number or aircraft altitude in which case a high-pass filter means is employed. In a further embodiment of the invention, there is provided an aircraft control system according to the above, wherein two apparatuses each constituted as said apparatus, are provided to control the gain of the control signal, each to receive a different representative signal and connected with each other so that the gain reduction effected by the output signal from one of the apparatuses (hereinbelow called the second apparatus) on exceeding the predetermined magnitude, is effected as an additional gain reduction to any gain reduction effected by the output signal of the other of the apparatuses (hereinbelow called the first apparatus). A further apparatus constituted as said apparatus may also be employed in the control system, to receive a different representative signal from the signal received by either of said first and second apparatuses, the further apparatus being connected with said first apparatus so that the output signals of the further apparatus and the first apparatus respectively, independently of each other, cause a reduction in the gain of the control signal on exceeding the predetermined magnitude; the gain reduction being larger if each of the output signals of the first and further apparatuses is above its predetermined respective magnitude.

Preferably, the representative signal received by the first, further and second apparatuses respectively are indicated air speed, Mach number and aircraft altitude.

The rectified and smoothed output or each of them may be fed to the input of a function generator, the output of the function generators or of each of the function generators as the case may be being fed to control the gain of an associated amplifier to which said control signal or modified control signal is fed.

The foregoing and further features of the invention will become apparent from the following description of some preferred embodiments thereof with reference to the accompanying drawings, in which:

FIGURE 4 shows further control apparatus also utilising the arrangement of FIGURE 1.

Figure 1:
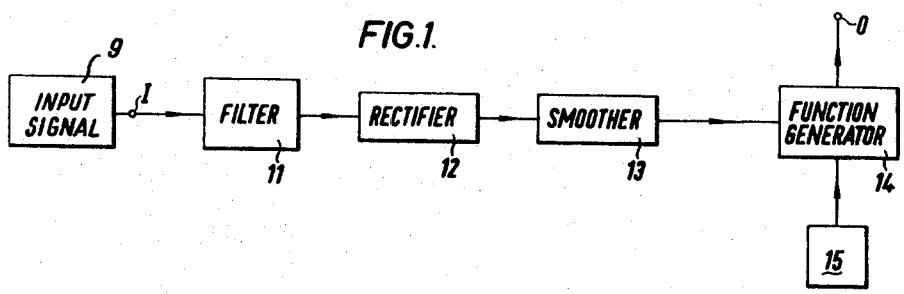
FIGURE 1 shows a block schematic representation of apparatus for inter alia determining when an aircraft enters disturbed air.

Referring now to FIGURE 1 there is shown a block schematic representation of an arrangement for modifying automatic control action when an aircraft enters disturbed air. The arrangement comprises an input terminal I connected to the input of a high-pass filter 11. The output from the high-pass filter 11 is connected via a rectifier arrangement 12 and a smoothing arrangement 13 to one input of a function generator 14. A further input to the function generator 14 is provided from a device 15. The output from the function generator is connected to an output terminal O.

Figure 2:
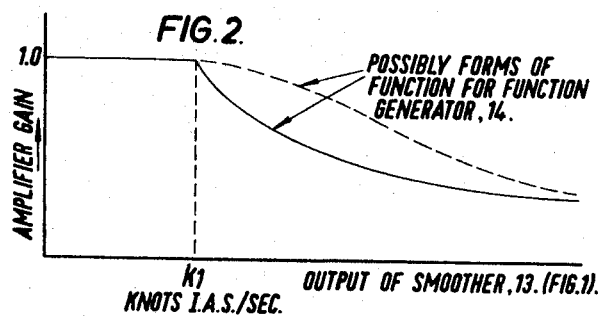
FIGURE 2 shows typical forms of function for the function generator of FIGURE 1.

The arrangement can be utilised to detect and measure the turbulence of air entered by an aircraft carrying the device. To achieve this an input signal from the measuring means 9 is fed to terminal I representative of the indicated air speed of the aircraft. This input is fed through the highpass filter 11 to remove the mean value, is rectified by the rectifier arrangement 12 and smoothed by the smoothing arrangement 13 to give a positive output from the smoothing arrangement 13 whose magnitude is a measure of the turbulence weighted towards the high frequencies. As previously stated this output from the smoothing arrangement 13 is fed as one input to the function generator 14. The other input to the function generator 14 fed from the device 15 comprises a signal representative of a predetermined rate of change of indicated air speed. The output from the function generator fed to the output terminal O can for example be as shown in FIGURE 2. The output from output terminal O is arranged to control the gain of an amplifier (not shown in FIGURE 1) through which an aircraft control signal is fed. As will be seen from FIGURE 2 all the time the rate of change indicated air speed is below a value $k_1$ (which is said predetermined rate of change of air speed) the gain of the amplifier is arranged to be unity whereas when the rate of change of air speed exceeds the predetermined value $k_1$ the gain of the amplifier is reduced.

When the arrangement of FIGURE 1 is utilised to determine turbulence the transfer functions for the high-pass filter 11, rectifier arrangement 12 and smoothing arrangement 13 should be as follows:

Output of high-pass filter equals $$\left|\frac{T_1 s}{1+T_1 s} \cdot V\right|$$

(where $V$ = indicated air speed)
Output of rectifier arrangement 12 equals $$\left|\frac{T_1 s}{1+T_1 s} \cdot V\right|$$

and
Output of smoothing arrangement 13 equals $$\frac{1}{1+T_2 s} \cdot \left|\frac{T_1 S \cdot V}{1+T_1 s}\right|$$

It is necessary to choose $k_1$ and the time constants $T_1$ and $T_2$ with some care to ensure that:

(1) Turbulence of very short duration (i.e., a few seconds) is ignored, even if severe;

(2) Turbulence of rather longer duration (i.e., 5 to 10 seconds) is still not given full weight according to its amplitude;

(3) Slow variations of air speed are given little weight according to amplitude if oscillatory and progressively less as the oscillation period increases, the corresponding output of the turbulence measuring unit being here nearly proportional to rate of change of air speed whether the variation is oscillatory or not, and (4) Acceleration or deceleration of the aircraft under autopilot control will not normally give any reduction of autopilot gain of aircraft control signals.

The choice of the smoothing time constant $T_2$ as about 5 seconds satisfies conditions 1 and 2 above.

The ouput of the smoothing arrangement 13, for frequencies $\omega$ radians per second high enough to ensure good smoothing, approximates to $$\frac{2}{\pi} \times$$

the amplitude of indicated air speed $V$ if $T_1\omega$ is much greater than unity. The value of time constant $T_1$ of 1 second would seem to be about the correct value, this giving an output of about $$\frac{2}{\pi} \times$$

amplitude of $V$ for $\omega$ much greater than 1, i.e., for turbulence frequencies exceeding about 1 cycle per second ($\omega = 2\pi$) with little attenuation down to considerably lower frequencies (e.g., 0.95 gain at $\omega=3$, 0.89 at $\omega=2$).

Slow oscillations of air speed are effectively amplitude-attenuated by the gain factor $$\frac{T_1 \omega}{\sqrt{(1+T_1^2 \cdot \omega^2)}}$$

which for $T_1 = 1$ equals 0.45 for $\omega = \frac{1}{2}$ (12 second period) or 0.2 for $\omega = \frac{1}{5}$ (31 second period). Hence it appears that the gain is very nearly equal to $\omega$ for periods longer than about 20 seconds, and for all slow changes of air speed the output of smoothing arrangement 13 representative of turbulence is almost $T_1 V$, i.e., 1 knot per second rate of change of indicated air speed when $T_1=1$ second. Hence the choice of $T_1$ as about 1 second satisfies condition 3 above.

The constant $k_1$ is chosen to attend to consideration 4 above. This requires the introduction of further constants $k_2$ and $k_3$ defined as follows:

With $\dot{V}$ constant at the largest value $k_2$ (knots indicated air speed) per second normally experienced when flying under autopilot control in nonturbulent conditions the output from smoothing arrangement 13 shall be equal to that due to flying in turbulence whose R.M.S. amplitude is $k_3$ (knots indicated air speed).

The above leads to the equations $$k_1 = T_1 k_2 = \frac{2\sqrt{2} k_3}{\pi}$$

With $T_1 = 1$ (second) these equations are satisfied by:
$k_1 = 4\frac{1}{2}$ (knots indicated air speed per second),
$k_2 = 4\frac{1}{2}$ (knots indicated air speed),
$k_3 = 5$ (knots indicated air speed).

Hence no change of autopilot gain will be made in turbulence whose R.M.S. magnitude is less than 5 knots indicated air speed, nor will such change be made when accelerating or decelerating at up to 4½ knots indicated air speed per second even for a period of time in excess of about 10 seconds. However, for shorter periods of time the "rate of change of indicated air speed threshold" would be increased progressively with reduction of the period. Thus at sea level 4½ knots indicated air speed per second is nearly ¼ g and at 40,000 ft. it is about ½ g (if due to acceleration rather than wind variation).

A similar arrangement to that shown in FIGURE 1 can be utilised with an input signal representative of Mach number instead of indicated air speed, in this case different but corresponding values of constants and time constants being utilised.

Further the arrangement of FIGURE 1 can be utilised with an input of height of the aircraft rather than indicated air speed or Mach number so that the output of smoother 13 to the function generator is proportional to the high frequency component of the input signal I. In this case an output from the device 15 is provided representative of some predetermined fixed value $k_4$ (feet per minute) of vertical speed of the aircraft. The value of the constant $k_4$ is of the order of 3,000 (feet per minute). In this case the time constants $T_1$ and $T_2$ are replaced by time constants $T_3$ and $T_4$. It is considered that the choice of the values for the time constants $T_3$ and $T_4$ is less critical than that of $T_1$ and $T_2$, $T_3$ being however of similar magnitude to $T_1$ and $T_4$ being of similar magnitude to $T_2$.

Figure 3:
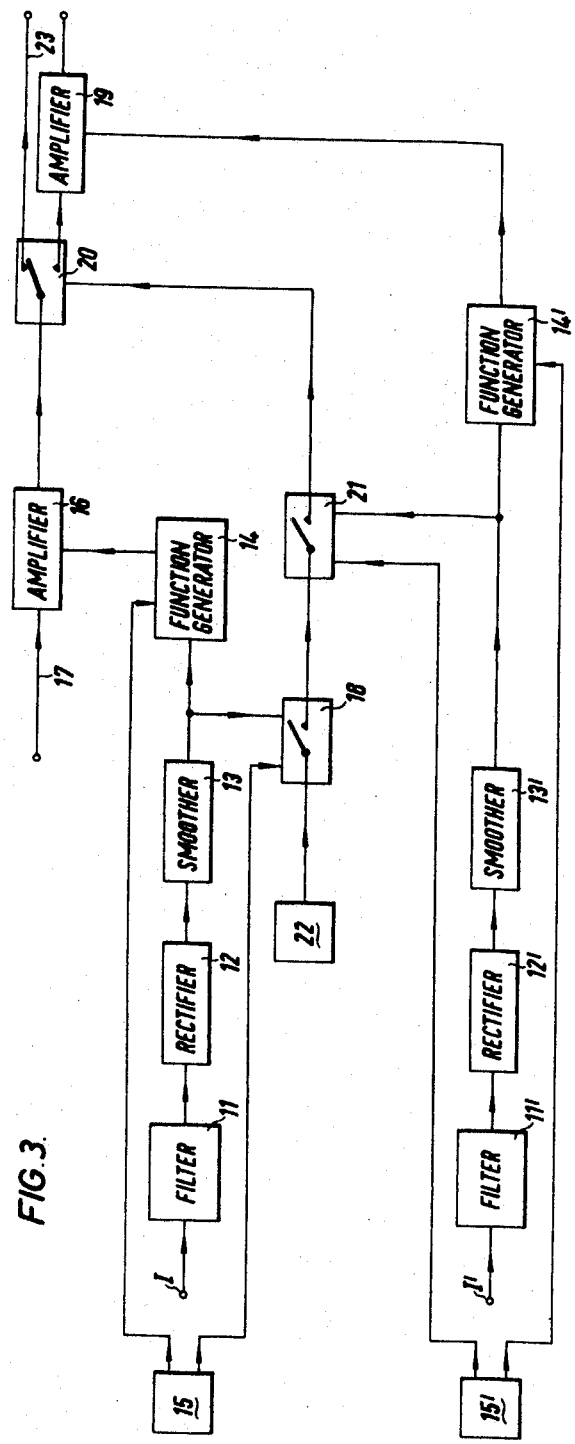
FIGURE 3 shows a block schematic representation of control apparatus for an aircraft utilising the arrangement of FIGURE 1.

Referring now to FIGURE 3 there is shown a block schematic representation of an arrangement for varying the gain of an aircraft control signal utilising two arrangements similar to that of FIGURE 1. The first of these arrangements, the elements of which are referenced 11 to 15 as in FIGURE 1, is arranged to be fed at its input terminal I with a signal representative of indicated air speed. The output from the function generator 14 is fed to reduce the gain of an amplifier 16 to which an aircraft control signal is fed via lead 17. The outputs from the device 15 and the smoothing arrangement 13 respectively as well as being fed to the function generator 14 are also fed to a switch arrangement 18, the switch arrangement 18 being arranged to be closed when the output from the smoothing arrangement 13 exceeds the output from the device 15.

The second arrangement similar to that of FIGURE 1 contains corresponding elements referenced 11' to 15' and has an input terminal I' arranged to be fed with a signal representative of aircraft height. The output from the function generator 14' is used to reduce the gain of the amplifier 19 when the switch 20 is actuated to connect the aircraft control signal (i.e., pitch control) at the lead 17 through amplifier 16 and switch 20 to the amplifier 19. The outputs of the smoothing arrangement 13' and the device 15' in addition to being fed to the function generator 14' are also fed to a switch arrangement 21, the switch arrangement 21 being such that the switch is closed when the output from smoothing arrangement 13' exceeds the output from the device 15'. The output of the device 15' is a signal corresponding to a fixed value of vertical speed of the aircraft.

A voltage source 22 is connected via the switch arrangements 18 and 21 to the switch arrangement 20, the switch arrangement 20 being arranged to be in a position to connect the output of amplifier 16 to the input of amplifier 19 when both switches 18 and 21 are closed allowing the voltage from voltage source 22 to reach the switch 20 and being such that the output from amplifier 16 is caused to bypass amplifier 19 and to be fed to lead 23 when either one of switch arrangements 18 or 21 is open preventing the voltage from the voltage source 22 reaching the switch 20.

Hence it will be seen that the aircraft control signal which is fed along lead 17 is attenuated by reduction in gain of the amplifier 16 if the output from smoothing arrangement 13 exceeds the output from the device 15 and is further attenuated by reduction in gain of the amplifier 19 when the output from smoothing arrangement 13' exceeds the output from the device 15' this latter reduction of gain by the amplifier 19 only being effective if the output from smoothing arrangement 13 exceeds the output from device 15.

The arrangement of FIGURE 3 is capable of detecting entry of the aircraft into a large moving air mass, mountain wave or undulance which are likely to cause considerable rates of change of height and air speed. Sustained rates of change of both air speed and height numerically exceeding certain values do not normally occur under autopilot control but may well occur in any of the above types of nonturbulent disturbed air.

Referring now to FIGURE 4 there is shown a block schematic representation of a control system similar to that of FIGURE 3 but including a further arrangement similar to the arrangement of FIGURE 1 but arranged to have fed to its input terminal I$a$ a signal representative of Mach number. This further arrangement includes elements as shown in FIGURE 1 referenced 11a to 15a, a further amplifier 16a whose gain is controlled by function generator 14a and which is connected in series between amplifier 16 and switch arrangement 20. In this case the switch arrangement 18 (of FIGURE 3) is supplemented by a further switch arrangement 18a connected in parallel therewith. The switch arrangement 18a receives inputs from the smoothing arrangement 13a and the device 15a and is arranged to be such that it is closed when the output from smoothing arrangement 13a exceeds the output from the device 15a.

Hence it will be seen that the operation of FIGURE 4 is the same as that for FIGURE 3 except that the amplifier 19 will be included in the circuit along which the aircraft control signal is to be fed when on the one hand the output from smoothing arrangement 13 exceeds the output from device 15 and/or the output from smoothing arrangement 13a exceeds the output from device 15a and when on the other hand the output from smoothing arrangement 13' exceeds the output of the device 15'. Hence when the outputs of the arrangements responsive to air speed and/or the Mach number of the aircraft exceed the predetermined values either one or both of these conditions will reduce the gain of the aircraft control signal and in addition the fact that the output of the arrangement responsive to height rate of the aircraft exceeds a predetermined value will also further reduce the gain of the aircraft control signal. It should be noted that no gain change is made for any climbs or descents however steep if made without sustained large rate of change of air speed or Mach number.

The predetermined Mach rate, i.e., $k_1'$ is of the order 0.0151/sec.

In the description of the embodiments the aircraft control signals to be operated on have not been closely defined. In practice the signals in the pitch channel, i.e., elevator demand signals should be reduced and the necessity to prevent autopilot disengagement might dictate inclusion of operation upon the roll and yaw channel signals also.

The arrangements shown prevent, by reducing the gearing of the control signals, excessive autopilot action which may occur when flying into a large moving air mass, which excessive action may cause the aircraft to remain either nose up or nose down for so long that, when it ceases or reverses, the effect of the then possibly considerable out-of-trim may pose severe control problems to the pilot. The arrangements shown enable an autopilot to remain engaged when entering turbulent and nonturbulent disturbed air, ensuring that the control action thereof is kept small automatically.

A further alternative embodiment of the invention (not shown) could be provided utilising an arrangement similar to that shown in FIGURE 1 to which a signal representative of vertical speed of the aircraft would be fed. In this case the high-pass filter would be replaced by a further suitable filtering arrangement.

Although the description of the embodiments contained herein refers to automatic control of an aircraft it should be realised that an arrangement as disclosed in FIGURE 1 could be utilised in conjunction for example with a flight director for providing an indication of when an aircraft has entered disturbed air.

I claim:

1. Apparatus for detecting when an aircraft enters disturbed air, comprising in combination:
   first means for measuring a function of aircraft movement along a specified axis and having an output indicative of such function,
   second means for producing an output which is of fixed value corresponding to a predetermined rate of change of said function of aircraft movement along said specified axis,
   filter means which receives said output of said first means and develops therefrom a signal free from any component representative of the mean value of said function of aircraft movement along said specified axis, and
   means for indicating a condition in which the output of said filter means exceeds the output of said second means.

2. Apparatus according to claim 1 wherein said function of aircraft movement along a specified axis is indicated air speed of the aircraft.

3. Apparatus according to claim 1 wherein said function of aircraft movement along a specified axis is aircraft altitude.

4. Apparatus according to claim 1 wherein said function of aircraft movement along a specified axis is Mach number.

5. Apparatus according to claim 1 wherein said function of aircraft movement along a specified axis is aircraft vertical velocity.

6. Apparatus for detecting when an aircraft enters disturbed air, comprising in combination:
   first and second means for measuring functions of aircraft movement along first and second orthogonally related axes,
   third and fourth means for producing outputs which are of fixed values corresponding to predetermined rates of change of the respective functions of aircraft movement measured by said first and second means,
   first and second filter means receiving the respective outputs of said first and second means to develop therefrom respective signals free from any components representative of the mean values of said respective functions of aircraft movement, and
   means for indicating a condition in which the output of either of said first and second filter means exceeds the respective outputs of said third and fourth means.

7. Apparatus according to claim 6 including a channel for controlling the aircraft about one of said axes, said control channel including amplifier means normally having a fixed gain characteristic, said means for indicating being connected to said amplifier means to decrease the gain thereof in response to a condition as stated.

8. An aircraft control system for controlling movement of the aircraft when flying in disturbed air, which comprises a first apparatus comprising a highpass filter means, means for feeding thereto a signal representative of indicated air speed, said filter means being such that the mean value of the indicated air speed is disregarded; means for rectifying and smoothing the output of said filter means to produce a first output signal whose magnitude is a measure of the air disturbance, and means for utilising the first output signal to reduce the gain of a control signal of the aircraft when the first output signal exceeds a predetermined magnitude; a second apparatus comprising a high-pass filter, means for feeding thereto a signal representative of the altitude of the aircraft, said filter means being such that the mean value of the altitude is disregarded; means for rectifying and smoothing the output of said filter means to produce a second output signal whose magnitude is a measure of the air disturbance, and means for utilising said second output signal to reduce the gain of the control signal, on exceeding a predetermined magnitude; and a switching circuit, each said utilising means being connected thereto and the switching circuit being such that any gain reduction effected by the utilising means of the second apparatus is effected as an additional reduction to any gain reduction effected by the utilising means of the first apparatus.

9. An aircraft control system as set forth in claim 8, wherein each of said utilising means comprises a function generator receiving as one input, the respective one of the first and second output signals and as a further input, a signal representing a rate of change of a predetermined magnitude in the variable represented by the respective one of the two representative signals, and amplifying means; the amplifying means of the first apparatus receiving as one input, the output of the function generator of the first apparatus and as a further input, the control signal; and the amplifying means of the second apparatus receiving as one input, the output of the function generator of the second apparatus and as a further input, any gain reduced output of the first amplifying means; the switching circuit being such that it connects the second amplifier to the first amplifier when the output of the latter has undergone a gain reduction but disconnects the two amplifiers otherwise.

10. An aircraft control system for controlling movement of the aircraft when flying in disturbed air, which comprises a first apparatus comprising two highpass filter means, means for feeding to one thereof a signal representative of the indicated air speed of the aircraft, means for feeding to the other thereof a signal representative of the Mach number of the aircraft; each said filter means being such that the mean value of the indicated air speed and the Mach number respectively is disregarded; means for each filter means for rectifying and smoothing the output thereof to produce a first output signal from said one filter means and a further output signal from said other filter means, the magnitudes of which output signals are each a measure of the air disturbance, and means for utilising the two output signals independently of one another to reduce the gain of a control signal of the aircraft when either of the output signals exceeds a predetermined magnitude; a second apparatus comprising a high-pass filter, means for feeding thereto a signal representative of the altitude, said filter means being such that the mean value of the altitude is disregarded, means for rectifying and smoothing the output of said filter means to produce a second output signal whose magnitude is a measure of the air disturbance and means for utilising the second output signal to reduce the gain of said control signal; and a switching circuit, each said utilising means being connected thereto and the switching circuit being such that any gain reduction of the control signal effected by the second apparatus is effected as an additional reduction to any gain reduction of the control signal effected by the first apparatus.

11. An aircraft control system as set forth in claim 10, wherein each of said utilising means comprises a function generator, and an amplifying means; the function generator of the utilising means utilising the first output signal, receiving the first output signal as one input and a signal representing a rate of change of a predetermined magnitude in the indicated air speed as a further input, and the amplifying means thereof receiving as one input the output of the function generator and as a further input, the control signal; the function generator of the utilising means utilising the further output signal, receiving as one input, the further output signal and as a further input, a signal representative of a rate of change of Mach number of a predetermined magnitude, and the amplifying means thereof receiving as one input, the output of the function generator and as a further input, the output of the first amplifying means; and the function generator of the utilising means of the second apparatus receiving as one input, the second output signal and as a further input, a signal representative of a rate of change of predetermined magnitude of aircraft altitude and the amplifying means thereof receiving as one input, the output of the function generator and as a further input, any gain reduced output of the further amplifier; the switching circuit being such that it connects the second amplifier to the further amplifier when the output of the latter is gain reduced but disconnects the second amplifier from the further amplifier otherwise.

12. An aircraft control system as set forth in claim 8, wherein said switching circuit comprises a voltage source, a switch which in one position connects the two utilising means to transmit an output of the utilising means of the first apparatus as an input to the utilising means of the second apparatus and in another position disconnects the two utilising means; a circuit connecting the voltage source with said switch; and two further switches, each to open and close said circuit, the two further switches being connected respectively to the two utilising means and being such that when the first and second output signals exceed said predetermined magnitude, the two further switches close said circuit to connect the voltage source to and to operate said first-mentioned switch and cause it to connect the two utilising means so that any gain-reduced output of the utilising means of the first apparatus is transmitted as an input to the utilising means of the second apparatus.

13. An aircraft control system as set forth in claim 10, wherein said switching circuit comprises a voltage source, a switch which in one position connects the utilising means of the two apparatuses to transmit any gain-reduced output of the first apparatus as an input to the utilising means of the second apparatus and in another position disconnects the utilising means of the two apparatuses; a circuit connecting the voltage source to said switch; and three further switches each to open and close said circuit; the three further switches being connected respectively to the three utilising means and being such that when the second output signal and one or both of the first and further output signals exceed said predetermined magnitude said circuit is closed to connect said voltage source to and to operate said first-mentioned switch so that any gain-reduced output of the two utilising means of the first apparatus is transmitted as an input to the utilising means of the second apparatus.

14. In an aircraft control system of the type having a channel for controlling the aircraft about one of its control axes, said channel including an amplifier normally having a fixed gain characteristic, the improvement comprising:

means for decreasing the gain of said amplifier in response to detection of excessive ambient air disturbances, said means comprising a control device having an output connected to said amplifier, a first signal generator having an output connected to said control device which is proportional to a predetermined fixed rate of a function of aircraft motion affecting control of the aircraft about said one control axis, a second signal generator for measuring said function of aircraft motion, high-pass filter means connected to the output of said second signal generator to produce an output which is proportional only to high frequency components of the measured function of aircraft motion, the output of said high-pass filter means being connected to said control device and influencing its output to decrease the gain of said amplifier when the output of said high-pass filter means exceeds the output of said first signal generator.

References Cited

UNITED STATES PATENTS

| | | | |
|---|---|---|---|
| 2,863,622 | 12/1958 | Ciscel | 244—77 |
| 2,944,768 | 7/1960 | Weber | 244—77 |
| 3,313,152 | 4/1967 | Kulda et al. | 244—77 |
| 2,862,167 | 11/1958 | Curry | 244—77 X |
| 3,030,053 | 4/1962 | Smith et al. | 244—77 |

FERGUS S. MIDDLETON, *Primary Examiner.*

U.S. Cl. X.R.

318—489